(12) United States Patent
Park et al.

(10) Patent No.: US 11,943,781 B2
(45) Date of Patent: Mar. 26, 2024

(54) METHOD FOR MONITORING, TRANSMITTING, AND RECEIVING DOWNLINK PRE-EMPTION INDICATION INFORMATION IN NEW RADIO NETWORKS AND APPARATUS THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT Corporation, Seongnam-si (KR)

( * ) Notice: Subject to any disclaimer, the term of this patent is extended or adjusted under 35 U.S.C. 154(b) by 143 days.

(21) Appl. No.: 17/307,978

(22) Filed: May 4, 2021

(65) Prior Publication Data
US 2021/0258938 A1   Aug. 19, 2021

Related U.S. Application Data

(63) Continuation of application No. 16/792,826, filed on Feb. 17, 2020, now Pat. No. 11,044,718, which is a
(Continued)

(30) Foreign Application Priority Data

Mar. 16, 2017 (KR) .......... 10-2017-0033297
Jun. 29, 2017 (KR) .......... 10-2017-0082920
(Continued)

(51) Int. Cl.
*H04W 72/23* (2023.01)
*H04W 72/121* (2023.01)
*H04W 72/566* (2023.01)

(52) U.S. Cl.
CPC .......... *H04W 72/23* (2023.01); *H04W 72/121* (2013.01); *H04W 72/569* (2023.01); *Y02D 30/70* (2020.08)

(58) Field of Classification Search
None
See application file for complete search history.

(56) References Cited

U.S. PATENT DOCUMENTS

2017/0295592 A1  10/2017  Yang et al.
2018/0027576 A1*  1/2018  Kowalski ............ H04W 72/569
                                                 370/329
(Continued)

FOREIGN PATENT DOCUMENTS

WO    2017/177083 A1    10/2017

OTHER PUBLICATIONS

Qualcomm Incorporated, "DL URLLC/eMBB dynamic multiplexing and indication design", R1-1702639, 3GPP TSG-RAN WG1 #88, Athens, Greece, Feb. 13-17, 2017, pp. 1-9.
(Continued)

*Primary Examiner* — Hassan A Phillips
*Assistant Examiner* — Camquyen Thai
(74) *Attorney, Agent, or Firm* — Insight Law Group, PLLC; Seung Lee

(57) ABSTRACT

Provided are a method for monitoring, transmitting, and receiving downlink pre-emption indication information in a next-generation/5G radio access network. The method may include receiving monitoring configuration information for downlink pre-emption indication information from a base station; receiving configuration information on a control resource set (CORESET) for receiving the downlink pre-emption indication information from the base station; configuring reference downlink resources based on the configuration information on a control resource set; and monitoring the downlink pre-emption indication information for the reference downlink resources.

28 Claims, 6 Drawing Sheets

Related U.S. Application Data continuation of application No. 15/920,524, filed on Mar. 14, 2018, now Pat. No. 10,609,699.

(30) Foreign Application Priority Data

Aug. 10, 2017 (KR) ........................ 10-2017-0101782
Feb. 6, 2018 (KR) ........................ 10-2018-0014571

(56) References Cited

U.S. PATENT DOCUMENTS

| | | | |
|---|---|---|---|
| 2018/0035332 A1* | 2/2018 | Agiwal | H04W 28/16 |
| 2018/0063865 A1 | 3/2018 | Islam et al. | |
| 2018/0070341 A1 | 3/2018 | Islam et al. | |
| 2018/0191470 A1 | 7/2018 | Manolakos et al. | |
| 2018/0227047 A1* | 8/2018 | Hosseini | H04L 5/0092 |
| 2019/0165906 A1 | 5/2019 | Bala et al. | |
| 2019/0379491 A1* | 12/2019 | Kilinc | H04L 1/1858 |

OTHER PUBLICATIONS

ZTE et al., "About URLLC and eMBB multiplexing in downlink", R1-1700264, 3GPP TSG RAN WG1 AH NR Meeting, Spokane, USA, Jan. 16-20, 2017, pp. 1-10.

Nokia et al., "On the mini-slot design in NR", R1-1701052, 3GPP TSG-RAN WG1#NR, Spokane, USA, Jan. 16-20, 2017, pp. 1-9.

ZTE, "About pre-emption indication", R1-1710123, 3GPP TSG RAN WG1 NR Ad-Hoc;tt-2, Qingdao, China, Jun. 27-30, 2017, pp. 1-6.

CATT, "[89-20] email discussion: Group-common PDCCH for NR", R1-1710968, 3GPP TSG RAN WG1 Meeting AH NR2, Qingdao, P.R. China, Jun. 27-30, 2017, pp. 1-22.

U.S. Appl. No. 62/417,933, filed Nov. 4, 2016.

U.S. Appl. No. 62/435,019, filed Dec. 15, 2016.

Fujitsu, "Discussion on Preemption Indicator for Multiplexing eMBB and URLLC in Downlink", R1-1701920, 3GPP TSG-RAN WG1 Meeting#88, Athens, Greece Feb. 13-17, 2017, pp. 1-5.

Nokia et al., "On indication for downlink punctured / preemptive scheduling", R1-1703327, 3GPP TSG-RAN WG1#88, Athens, Athens, Greece, Feb. 13-17, 2017, pp. 1-4.

Samsung, "Summary of e-mail discussions on multiplexing eMBB and URLLC in DL", R1-1700972, TSG-RAN WG1 NR Ad-hoc Meeting, Spokane, USA, Jan. 16-20, 2017, pp. 1-23.

* cited by examiner

METHOD FOR MONITORING, TRANSMITTING, AND RECEIVING DOWNLINK PRE-EMPTION INDICATION INFORMATION IN NEW RADIO NETWORKS AND APPARATUS THEREOF

CROSS REFERENCE TO RELATED APPLICATION

This application is a continuation of U.S. application Ser. No. 16/792,826, filed on Feb. 17, 2020, which is a continuation of U.S. patent application Ser. No. 15/920,524, filed on Mar. 14, 2018, which claims priority under 35 U.S.C. § 119 to Korean Patent Application Nos. 10-2017-0033297, filed on Mar. 16, 2017, 10-2017-0082920, filed on Jun. 29, 2017, 10-2017-0101782, filed on Aug. 10, 2017 and 10-2018-0014571, filed on Feb. 6, 2018.

BACKGROUND OF THE INVENTION

Field of the Invention

The present embodiments relate to a method for monitoring, transmitting, and receiving downlink pre-emption indication information in a next-generation/5G radio access network {hereinafter, also referred to as "NR (New Radio)"}.

Description of the Prior Art

Recently, 3rd generation partnership project (3GPP) has approved the study item "Study on New Radio Access Technology" for studying next-generation/5G radio access technology. Based on the same, 3GPP has discussed a frame structure, channel coding and modulation, waveform and multiple access schemes, and the like for NR (New Radio) in radio access network working group 1 (RAN WG1). It is necessary to design the NR to satisfy various requirements for respective segmented and specified usage scenarios, as well as an improved data transmission rate in comparison with long term evolution (LTE)/LTE-Advanced.

Enhanced Mobile BroadBand (eMBB), massive Machine Type Communication (mMTC), and Ultra Reliable and Low Latency Communication (URLLC) have been proposed as typical usage scenarios for the NR, and flexible frame structure design is required, compared to LTE/LTE-Advanced, in order to meet the requirements of the respective scenarios.

In particular, services, such as eMBB and mMTC in the NR, are more efficient as time-section resource assignment is lengthened in terms of cell throughput and coverage, while a service of URLLC is more efficient as time-section resource assignment is shortened because of a latency problem. Therefore, it is necessary to support efficient multiplexing for data traffic between the respective services in a network in which the eMBB, mMTC, and URLLC services are mixed.

SUMMARY OF THE INVENTION

An aspect of the present embodiments is to provide a specific method for supporting efficient multiplexing for data traffic between respective services in a network that simultaneously provide various services having different QoS requirements, such as eMBB, mMTC, and URLLC services in the NR.

An embodiment, which has been made in order to solve the above problem, provides a method for receiving downlink pre-emption indication information by a user equipment, the method including: receiving monitoring configuration information for downlink pre-emption indication information from a base station; receiving configuration information on a control resource set (CORESET) for receiving the downlink pre-emption indication information from the base station; configuring reference downlink resources based on the configuration information on a control resource set; and monitoring the downlink pre-emption indication information for the reference downlink resources.

Another embodiment provides a method for transmitting downlink pre-emption indication information by a base station, the method including: configuring monitoring configuration information for downlink pre-emption indication information; transmitting, to a user equipment, configuration information on a control resource set (CORESET) for transmitting the downlink pre-emption indication information; and transmitting, to the user equipment, the downlink pre-emption indication information for reference downlink resources.

Another embodiment provides a user equipment for receiving downlink pre-emption indication information, the user equipment including: a receiver configured to receive monitoring configuration information for downlink pre-emption indication information from a base station, and configured to receive configuration information on a control resource set (CORESET) for receiving the downlink pre-emption indication information from the base station; and a controller configured to configure reference downlink resources based on the configuration information on the control resource set, and configured to monitor the downlink pre-emption indication information for the reference downlink resources.

Another embodiment provides a base station for transmitting downlink pre-emption indication information, the base station including: a controller configured to configure monitoring configuration information for downlink pre-emption indication information; and a transmitter configured to transmit, to a user equipment, configuration information on a control resource set (CORESET) for transmitting the downlink pre-emption indication information, and configured to transmit, to the user equipment, the downlink pre-emption indication information for the reference downlink resources.

According to the present embodiments, it is possible to provide a specific method for supporting efficient multiplexing for data traffic between the respective services in a network where services having different QoS requirements, such as eMBB, mMTC, and URLLC services, are mixed in the NR.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
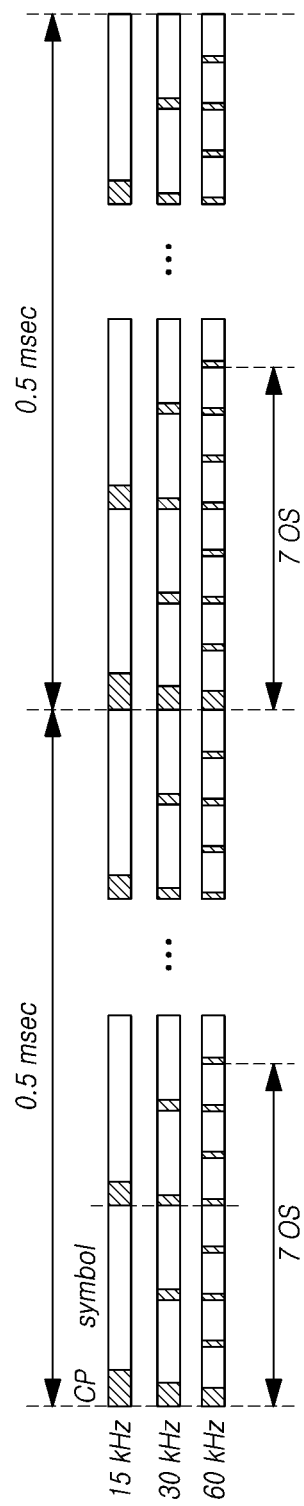
FIG. 1 is a diagram illustrating OFDM symbol alignment in case of using different subcarrier spacing according to at least one of embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

As used herein, a wireless communication system may be a system for providing various communication services such as a voice service and a packet data service. The wireless communication system may include a User Equipment (UE) and a Base Station (BS or an eNB).

The user equipment may be a comprehensive concept that indicates a terminal for use in wireless communication, including a UE (User Equipment) in wideband code division multiple access (WCDMA), LTE, high speed packet access (HSPA), international mobile telecommunication (IMT)-2020 (5G or New Radio), and the like, and a MS (Mobile station), a UT (User Terminal), an SS (Subscriber Station), a wireless device, and the like in global systems for mobile communication (GSM).

A base station or a cell may generally refer to a station where communication with a User Equipment (UE) is performed. Such a base station or cell means, inclusively, all of various coverage areas such as a Node-B, an evolved Node-B (eNB), gNode-B (gNB), Low Power Node (LPN), a Sector, a Site, various types of antennas, a Base Transceiver System (BTS), an Access Point, a Point (e.g., transmitting point, receiving point, or transceiving point), a Relay Node, a Mega Cell, a Macro Cell, a Micro Cell, a Pico Cell, a Femto Cell, a Remote Radio Head (RRH), a Radio Unit (RU), and a Small Cell.

Each of the cells has a base station that controls a corresponding cell. Thus, the base station may be construed in two ways. 1) the base station may be a device itself that provides a megacell, a macrocell, a microcell, a picocell, a femtocell, and a small cell in association with a wireless area, or 2) the base station may indicate a wireless area itself. In 1), all devices that interact with one another to enable the devices that provide a predetermined wireless area to be controlled by an identical entity or to cooperatively configure the wireless area, may be indicated as a base station. Based on a configuration type of a wireless area, a point, a transmission/reception point, a transmission point, a reception point, or the like may be an embodiment of a base station. In a wireless area itself that receives or transmits a signal from a perspective of a terminal or a neighbouring base station, may be indicated as a base station.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

In the specification, the user equipment and the base station are used as two (uplink or downlink) inclusive transceiving subjects to embody the technology and technical concepts described in the specifications. However, the UE and the base station may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Uplink transmission and downlink transmission may be performed using a TDD (Time Division Duplex) scheme that performs transmission based on different times. Uplink transmission and downlink transmission may also be performed using an FDD (Frequency Division Duplex) scheme that performs transmission based on different frequencies or a mixed scheme of the TDD and FDD schemes.

Further, in a wireless communication system, a standard may be developed by configuring an uplink and a downlink based on a single carrier or a pair of carriers.

The uplink and the downlink may transmit control information through a control channel, such as a PDCCH (Physical Downlink Control CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

A downlink may refer to communication or a communication path from a multi-transmission/reception point to a terminal, and an uplink may refer to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, a situation, in which signals are transmitted and received through a channel such as a PUCCH, a PUSCH, a PDCCH, or a PDSCH, will be expressed as the transmission and reception of a PUCCH, a PUSCH, a PDCCH, or a PDSCH.

Meanwhile, higher layer signalling includes an RRC signalling that transmits RRC information including an RRC parameter.

A base station performs downlink transmission to terminals. A base station may transmit a physical downlink control channel for transmitting downlink control information such as scheduling required to receive a downlink data channel that is a main physical channel for unicast transmission, and scheduling approval information for transmission on an uplink data channel. Hereinafter, transmission and reception of a signal through each channel will be described as transmission and reception of a corresponding channel.

Varied multiple access schemes may be unrestrictedly applied to the wireless communication system. Various multiple access schemes, such as TDMA (Time Division Multiple Access), FDMA (Frequency Division Multiple Access), CDMA (Code Division Multiple Access), OFDMA (Orthogonal Frequency Division Multiple Access), NOMA (Non-Orthogonal Multiple Access), OFDM-TDMA, OFDM-FDMA, OFDM-CDMA, and the like may be used.

Here, NOMA includes SCMA (Sparse Code Multiple Access), LDS (Low Cost Spreading), and the like.

An embodiment of the present disclosure may be applicable to resource allocation in an asynchronous wireless communication scheme that evolves into LTE/LTE-advanced and IMT-2020 through GSM, WCDMA, and HSPA, and may be applicable to resource allocation in a synchronous wireless communication scheme that evolves into CDMA, CDMA-2000, and UMB.

In the present specifications, a machine type communication (MTC) terminal refers to a terminal that is low cost (or is not very complexity), a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type. Alternatively, the MTC terminal may refer to a further Enhanced MTC terminal defined in Relase-14.

In the present specification, a NarrowBand-Internet of Things (NB-IoT) user equipment represents a user equipment supporting radio access for the cellular IoT. The objectives of NB-IoT technology include improved indoor coverage, support for large-scale and low-speed user equipments, low-latency sensitivity, low-cost user equipments, low power consumption, and optimized network architecture.

Enhanced Mobile Broadband (eMBB), massive Machine Type Communication (mMTC), and Ultra Reliable and Low Latency Communication (URLLC) have been proposed as typical usage scenarios in NR (New Radio) and are thus under discussion in 3GPP.

In the present specification, a frequency, a frame, a subframe, a resource, a resource block, a region, a band, a subband, a control channel, a data channel, a synchronization signal, various reference signals, various signals, and various messages in relation to NR (New Radio) may be interpreted according to various meanings, which have been used in the past, are being used presently, or will be used in the future.

NR (New Radio)

Recently, 3GPP has approved the study item "Study on New Radio Access Technology" for research on next-generation/5G radio access technology and has started discussions on a frame structure, channel coding and modulation, waveform and multiple access schemes, and the like for NR (New Radio) based on the same.

It is required to design the NR to satisfy various requirements for each segmented and specified usage scenario, as well as an improved data transmission rate in comparison with LTE/LTE-Advanced. In particular, Enhanced Mobile BroadBand (eMBB), massive Machine-Type Communication (mMTC), and Ultra Reliable and Low Latency Communication (URLLC) have been proposed as typical usage scenarios of the NR, and flexible frame structure design is required, compared to LTE/LTE-Advanced, in order to meet the requirements of the respective scenarios.

More specifically, eMBB, mMTC, and URLLC are under consideration as typical usage scenarios of the NR, which are under discussion in 3GPP. The respective usage scenarios have different requirements for data rates, latency, coverage, or the like. Thus, in order to efficiently satisfy the requirements for each usage scenario through a frequency band constituting an NR system, there is a need for a method of efficiently multiplexing radio resource units based on different numerologies (e.g., subcarrier spacing, subframes, TTIs, or the like).

To this end, there have been discussions on a method of multiplexing and supporting numerologies having different subcarrier spacing (SCS) values, based on TDM, FDM, or TDM/FDM, through a single NR carrier and a method of supporting one or more time-units when a scheduling unit is configured in a time domain. In this regard, in the NR, a subframe has been defined as one of time-domain structures, and there was a decision to define, as a reference numerology for defining corresponding subframe duration, a single subframe duration including 14 OFDM symbols of normal CP overhead based on 15 kHz subcarrier spacing (SCS), which is the same as LTE. According to this, the subframe in the NR has a time duration of 1 ms. However, unlike the LTE, a slot and a mini-slot may be defined as a time unit, which is the basis of actual uplink/downlink data scheduling, for the absolute reference time duration in the subframe of the NR. In this case, the number of OFDM symbols (a y-value) constituting the corresponding slot has been determined to have a value of y=14 irrespective of the numerology.

Accordingly, any slot may include 14 symbols. All of the symbols may be used for downlink (DL) transmission, all of the symbols may be used for uplink (UL) transmission, or the symbols may be used in the form of a DL portion+a gap+a UL portion depending on the transmission direction of the corresponding slot.

In addition, a mini-slot including fewer symbols than a corresponding slot may be defined in a numerology (or SCS) and, based on this, a short time-domain scheduling interval may be configured for uplink/downlink data transmission/reception, or a long time-domain scheduling interval may be configured through slot aggregation for uplink/downlink data transmission/reception.

In particular, in the case of transmission and reception of latency-critical data such as URLLC, when the scheduling is performed in a slot unit of 0.5 ms (7 symbols) or 1 ms (14 symbols), defined in a frame structure based on a numerology having a small SCS value, such as 15 kHz, it may be difficult to satisfy the latency requirements. Therefore, a mini-slot including fewer OFDM symbols than the corresponding slot may be defined, thereby enabling the scheduling for latency-critical data, such as the URLLC, based on the same.

Alternatively, a method is also under consideration for supporting numerologies having different SCS values by multiplexing the same using a TDM scheme or an FDM scheme in a single NR carrier as described above, thereby scheduling data to conform to the latency requirements based on a slot (mini-slot) length defined for each numerology. For example, in the case where the SCS is 60 kHz as shown in FIG. 1, the symbol length thereof is reduced to about ¼ of the symbol length for the SCS of 15 kHz. Therefore, when a single slot includes 7 OFDM symbols, the 15 kHz-based slot is 0.5 ms long, while the 60 kHz-based slot length is reduced to about 0.125 ms.

That is, in the NR, there is discussion on a method for satisfying the respective requirements of URLLC and eMBB by defining different SCS or different TTIs.

As described above, there is a discussion on a method for supporting scheduling units having different lengths in a time domain to satisfy various usage scenarios in the NR. In particular, to satisfy the URLLC requirements, it is necessary to subdivide the scheduling unit in the time domain. However, excessively subdivided time-domain scheduling units are not desirable in terms of cell throughput for the eMBB because they involve excessive control overhead. In addition, a longer time-section resource assignment structure may be more suitable for coverage enhancement in terms of the mMTC.

In accordance with at least one embodiment, an effective downlink data channel resource assignment method may be provided for supporting efficient multiplexing between data traffic of each service in a network where services, which is efficiently used with long time-section resource assignment, such as eMBB and mMTC, and services requiring short time-section resource assignment, such as URLLC, are mixed.

The embodiments described below may be applied to user equipments, base stations, and core network entities (MME) using any mobile communication technologies. For example, the embodiments may be applied to next-generation mobile communication (5G mobile communication or New-RAT) user equipments, base stations, and core network entities {Access and Mobility function (AMF)}, as well as mobile communication user equipments adopting LTE technology. Hereinafter, for the convenience of description, a base station may represent an eNB of an LTE/E-UTRAN or a base station {a CU (Central Unit), a DU (Distributed Unit), or a single logical entity implemented by a CU and a DU} or a gNB in a 5G wireless network in which the CU and the DU are separated.

In the usage scenario of the NR, the URLLC refers to a service for supporting high reliability and low latency, which is used in the case where the delay of data transmission/reception causes a serious problem even though a small amount of data is transmitted/received. For example, the URLLC service may be used for an autonomous vehicle, wherein if the delay of data transmission/reception increases, human and material damages due to traffic accidents may occur.

The eMBB is a service that is used when a large amount of data is required to be transmitted/received using a service supporting high-speed data transmission. For example, when a large amount of data needs to be transmitted per unit time, such as in the case of a 3D video or MD service, the eMBB service may be used.

The mMTC is a service that is used when low power consumption is required while a small amount of data is transmitted/received and delay does not cause a problem. For example, the mMTC service may be used for sensor devices provided to build a smart city because a battery mounted in the sensor device must be operated for as long a time as possible.

In general, one of the three services (i.e., the URLLC, the eMBB, and the mMTC) described above may be provided to a user equipment according to the characteristics thereof. Hereinafter, a user equipment using the URLLC service may be referred to as an URLLC user equipment, a user equipment using the eMBB service may be referred to as an eMBB user equipment, and a user equipment using the mMTC service may be referred to as an mMTC user equipment. In addition, the eMBB, the mMTC, and the URLLC may also be interpreted as an eMBB user equipment, an mMTC user equipment, and an URLLC user equipment, respectively.

In the specification, the term "pre-emption" means reassignment of some of the resources, which have been assigned to the eMBB or the mMTC, to the URLLC in order to satisfy the latency requirements for the URLLC when traffic occurs in the URLLC. Such a term "pre-emption" may also be expressed using the term "puncturing" or "superposition" as will be described in the embodiments below (however, the present disclosure is not limited to specific terms). When pre-emption occurs, downlink data transmission to the eMBB user equipment is discontinuously interrupted in the middle of transmission in order to perform downlink data transmission to the URLLC user equipment. Therefore, in the present embodiment, the occurrence of pre-emption may be interpreted to mean that discontinuous transmission occurs in the eMBB user equipment, and the occurrence of pre-emption may be expressed as the occurrence of discontinuous transmission.

At this time, since the resources, which have already been assigned to the eMBB or the mMTC, are used for the URLLC, the eMBB user equipment or the mMTC user equipment having resources assigned thereto is required to receive information on the resources to be pre-empted. Downlink pre-emption refers to the pre-emption of downlink resources of the user equipment.

The downlink pre-emption indication information is intended to indicate to the user equipment the data channel that is pre-empted in the downlink, and the downlink pre-emption may be referred to as downlink pre-emption notification information because it informs the user equipment of the downlink pre-emption. The downlink pre-emption indication information may be indicated in the form of a signal or a channel.

Hereinafter, various embodiments of a method, in which a user equipment and a base station monitor and transmit/receive downlink pre-emption indication information, will be described in more detail.

The embodiments described below may be applied individually or by means of a combination thereof.

As described above, in order to support the URLLC service in the NR, it is necessary to support a short scheduling unit {or Transmission Time Interval (TTI)} capable of satisfying a latency boundary in the time domain. On the other hand, in the case of the eMBB or the mMTC, it may be efficient to apply a slightly longer time-section resource assignment unit than the usage scenario of the URLLC in terms of control overhead and coverage when defining a scheduling unit in the time domain.

In order to satisfy various usage scenarios of the NR as described above, it is necessary to support a mixed numerology structure supporting a numerology of subcarrier spacing (e.g., larger subcarrier spacing, such as 60 kHz, 120 kHz, or the like), which makes it easy to define a short time-section resource assignment unit suitable for the URLLC, and a numerology of subcarrier spacing suitable for the eMBB and the mMTC (e.g., 15 kHz for the eMBB or 3.75 kHz for the mMTC) through a single NR carrier, or to support time-domain scheduling units having different lengths, such as subframes, slots, or mini-slots, in an NR carrier that operates with a single numerology.

One example of a method for this may be defined such that time/frequency resources (or regions), which are assigned based on an optimal scheduling unit for each usage scenario, are assigned semi-statically, and resource assignment is performed using time/frequency resources of the region corresponding to the usage scenario for each user equipment according thereto.

However, semi-static resource assignment is inefficient in terms of radio resource utilization in an environment in which traffic is randomly generated for each usage scenario.

In order to solve this problem, when assigning downlink data transmission resources, it is required to support dynamic puncturing-based eMBB/URLLC multiplexing in which some of the downlink radio resources, which have been assigned for eMBB or mMTC data transmission, are punctured and used for urgent URLLC data transmission/reception or to support superposition-based eMBB/URLLC multiplexing in which URLLC data transmission signals are superposed onto some of the radio resources to then be transmitted.

In other words, a method is under consideration, which supports dynamic resource sharing between the eMBB and the URLLC such that some resources are punctured (or superposed) from among the eMBB (or mMTC) downlink resources, which have already been assigned and through which transmission is ongoing, and used for urgent URLLC data transmission.

That is, a method is under consideration, in which when downlink data, which is more latency-critical than ongoing PDSCH transmission, which has been assigned with resources in a unit of a slot or aggregated slots, is received from a base station/network, pre-emption of the latency-critical PDSCH transmission is performed and some resources are punctured from among the ongoing PDSCH transmission resources to then be assigned for the latency-critical PDSCH transmission.

Additionally, a method is under consideration, in which when a dynamic resource sharing method on a basis of dynamic puncturing (or superposition) between the eMBB and the URLLC is applied to NR downlink, a corresponding eMBB user equipment receives an indication on the radio resources punctured for the URLLC data transmission through explicit signalling.

As the explicit signalling-based indication method, i) a method of indicating puncturing information within a TTI (or slot, mini-slot, or aggregated slots) in which downlink data transmission is performed by the eMBB user equipment and a method of indicating puncturing information within a TTI following the corresponding TTI are under consideration.

In accordance with at least one embodiment, a downlink radio resource assignment method may be provided for efficiently supporting dynamic resource sharing between the eMBB and the URLLC as described above.

Although the embodiment will be described based on usage scenarios of the eMBB, the URLLC, or the like, from viewpoints of radio resource assignment and downlink data transmission/reception, the eMBB may correspond to a user equipment or a data session in which a long time-section resource assignment unit in a unit of a slot or aggregated slots is defined, and the URLLC may correspond to a user equipment or a data session in which a short time-section resource assignment unit, such as a mini-slot, symbol, or large SCS (e.g., 60 kHz or 120 kHz)-based slot unit, is defined.

More specifically, the embodiment may correspond to a partial radio resource puncturing technique for ongoing downlink transmission, in which puncturing (or superposition) is performed in a unit of a mini-slot or a symbol from the downlink data transmission resources assigned in a unit of a slot or slots or in which only some frequency resources (some PRBs) are punctured (or superposed) even in the corresponding mini-slot or symbol.

That is, the present disclosure may be interpreted from viewpoints of a mini-slot or symbol-based puncturing method or a puncturing method for some of the resources assigned for the corresponding downlink data transmission and explicit signalling therefor.

Accordingly, an eMBB user equipment or eMBB data corresponds to downlink data transmission on a basis of a scheduling unit in a slot unit or having a long time-section, in which the puncturing can be performed from among given downlink data transmission resources, in the present embodiment. In addition, a URLLC user equipment or URLLC data corresponds to downlink data transmission in which some of the downlink resources, which have been assigned for the eMBB user equipment or eMBB data transmission, are punctured and used.

In the present embodiment, for the convenience of description, in the case where puncturing of the ongoing PDSCH transmission resources for any (eMBB) user equipment is performed for latency-critical PDSCH transmission (i.e., for URLLC PDSCH transmission), the signal of a base station for indicating the same to the corresponding (eMBB) user equipment will be referred to as a dynamic puncturing indication signal, but the present disclosure is not limited to the term. According to the scope of the present embodiments, the corresponding signal may be referred to as a dynamic puncturing indication signal, a puncturing indication signal, a superposition indication signal, or a pre-emption indication signal, or may be further referred to as any other terms.

Embodiment 1: Definition of User Equipment (UE) Capability

When defining user equipment (UE) capability for any NR user equipment (particularly, when defining downlink data reception capability of the user equipment), it is possible to define whether to support puncturing-based (or superposition-based) dynamic resource sharing for downlink data transmission of another time-critical user equipment with respect to the NR PDSCH resources assigned for the corresponding user equipment.

Alternatively, it is possible to consider the case where some radio resources are punctured from among the radio resources, through which PDSCH transmission for a certain user equipment is in progress, for time-critical PDSCH transmission in an NR cell/base station or the case where time-critical PDSCH transmission signals are additionally transmitted using superposition onto some of the radio resources. At this time, it is possible to define whether to support explicit puncturing indication signalling to notify the corresponding user equipment of the same, demodulation and decoding based on PDSCH reception excluding resources pre-empted for the time-critical data transmission based on explicit puncturing indication information, and fast recovery capability based on the same.

Embodiment 2. Dynamic Puncturing Mode Configuration

Method 1. Explicit Signalling-Based Configuration Method

When assigning downlink data channel resources to a user equipment in a corresponding cell, an NR base station/cell/TRP may determine whether or not to support dynamic puncturing for some resources (in a unit of a mini-slot, a symbol, or some time/frequency resources) within a TTI defined (or configured) for the corresponding user equipment, and may transmit the same to the corresponding user equipment through UE-specific, cell-specific, or UE-group-specific higher-layer signalling.

When determining whether to support the PDSCH transmission through the UE-specific, cell-specific, or UE-group-specific higher-layer signalling as described above, the corresponding user equipment may monitor control information indicating dynamic puncturing for the PDSCH transmission resources through downlink control channel in a TTI, in which the PDSCH reception is in progress, or in a TTI subsequent thereto according to the explicit signalling method for indicating dynamic puncturing.

As an alternative method, when assigning downlink data channel resources to a user equipment in a cell, an NR base station/cell/transmitting and receiving point (TRP) may determine whether to support dynamic puncturing for some resources (in a unit of a mini-slot, a symbol, or some time/frequency resources) within a TTI defined (or configured) for the corresponding user equipment, and may transmit the same to the corresponding user equipment through L1/L2 control signalling.

That is, when transmitting downlink data scheduling control information for a certain user equipment {that is, transmitting downlink (DL) assignment downlink control information (DCI)} through an NR PDCCH, which is an L1 control channel, it is possible to perform configuration such that the DCI includes resource assignment information on the PDSCH and configuration information on whether to support dynamic puncturing for URLLC user equipment data transmission during the ongoing transmission for the PDSCH.

When it is determined whether to support dynamic puncturing for each PDSCH transmission through the DL assignment DCI as described above, the user equipment may perform monitoring to receive control information indicating the dynamic puncturing for the PDSCH transmission resources through downlink control channel in a TTI, in which the PDSCH reception is in progress, or in a TTI subsequent thereto according to the explicit signalling method for indicating dynamic puncturing.

As another method, it may be determined whether to support the dynamic puncturing by means of a combination of the above-described higher-layer signalling and L1/L2 control signalling. That is, an NR base station/cell/transmitting and receiving point (TRP) may preferentially configure whether to support dynamic puncturing for a user equipment in the corresponding cell through UE-specific, cell-specific, or UE-group-specific higher-layer signalling.

When the support of a dynamic puncturing mode is configured for any user equipment through the higher-layer signalling as described above, an NR base station/cell/transmitting and receiving point (TRP), when assigning PDSCH transmission resources for the corresponding user equipment, may additionally include configuration information on the dynamic puncturing in a PDSCH transmission/reception TTI assigned through the DL assignment DCI, and the TRP may transmit the same to the user equipment.

In other words, a user equipment that is set to be in a dynamic puncturing mode through the higher-layer signalling may be configured to perform monitoring for a DL assignment DCI format including dynamic puncturing support configuration information in the PDSCH reception TTI and to determine whether dynamic puncturing for the PDSCH occurs according to the dynamic puncturing support configuration information in the DL assignment DCI format.

As described above, when it is determined whether to support dynamic puncturing for the PDSCH transmission through the UE-specific, cell-specific, or UE-group-specific higher-layer signalling and the DL assignment DCI, the user equipment may monitor control information indicating dynamic puncturing for the PDSCH transmission resources through downlink control channel in a TTI, in which the PDSCH reception is in progress, or in a TTI subsequent thereto according to the explicit signalling method for indicating dynamic puncturing.

With regard to the dynamic puncturing mode configuration method described above, the dynamic puncturing mode configuration by the method may be interpreted as configuring whether to monitor explicit signalling for indicating the dynamic puncturing in a TTI or a TTI subsequent thereto.

That is, as described above, it is possible i) to configure whether to monitor the dynamic puncturing indication signal or pre-emption indication signal through UE-specific, cell-specific, or UE-group-specific higher-layer signalling, to configure whether to monitor the dynamic puncturing indication signal or pre-emption indication signal through L1 control signalling, or to configure whether to monitor the dynamic puncturing indication signal or pre-emption indication signal through a combination of the UE-specific, cell-specific, or UE-group-specific higher-layer signalling and the L1 control signalling.

When the monitoring for the dynamic puncturing indication signal or pre-emption indication signal is configured for any user equipment according to the above-described method, a monitoring time for the pre-emption indication signal may be further configured.

For example, a transmission time or a transmission period of the pre-emption indication signals for the PDSCH transmitted through the slot or aggregated slots may be configured implicitly or through UE-specific, cell-specific, or UE-group-specific higher-layer signalling, for each slot or each set of aggregated slots, by a base station.

For example, a constant timing gap (e.g., K slots, where K is an integer) may be defined between a PDSCH transmission slot and a pre-emption indication signal through each slot or aggregated slots.

As described above, consideration is given to the case where configuration information, which is related to a transmission timing of the pre-emption indication signal, such as a transmission time or period of the pre-emption indication signal, is configured by a base station or is defined implicitly. In this case, the user equipment configured to monitor the pre-emption indication signal may be defined to perform monitoring for the pre-emption indication signal only for the pre-emption indication signal transmission time corresponding to the slot or aggregated slots, in which PDSCH transmission is actually performed for the user equipment, or a control resource set (CORESET) or a search space for the pre-emption indication signal defined at the corresponding time, regardless of configuration of a transmission time of the pre-emption indication signal for each slot or each set of aggregated slots.

That is, when a base station/network configures a user equipment to monitor signals of puncturing indication or pre-emption indication, the base station/network configures a CORESET for monitoring the puncturing indication or pre-emption indication and transmits the same to the user equipment through UE-specific, cell-specific, or UE-group-specific higher-layer signalling.

For example, puncturing indication information or pre-emption indication information may be configured by means of group-common DCI to then be transmitted to the user equipment through the PDCCH. In this case, control information on a CORESET for monitoring group-common pre-emption indication DCI (that is, a group-common CORESET for pre-emption indication) (however, the present embodiment is not limited to the terms) may be transmitted to the respective user equipments by the base station/network through higher-layer signalling.

Figure 2:
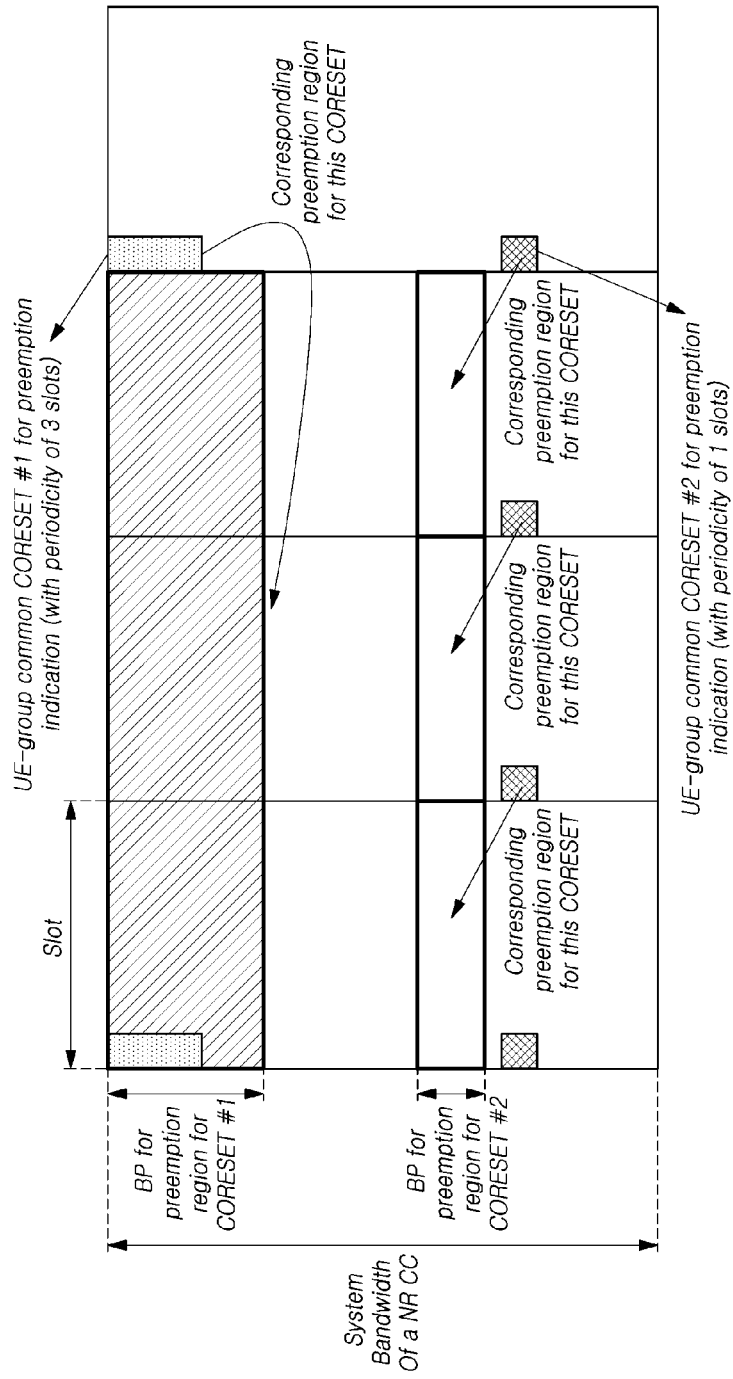
FIG. 2 is a diagram illustrating control resource sets (CORESETs) for transmitting pre-emption indication information and pre-emption regions corresponding to control resource sets in at least one embodiment.

The group-common CORESETs for pre-emption indication described above may be defined to have a one-to-one correspondence relationship with the pre-emption regions as shown in FIG. 2.

Referring to FIG. 2, a group-common CORESET #1 for pre-emption indication may be transmitted to a user equipment at every 3 slots, and each CORESET may correspond to a pre-emption region including three slots just before the slot to which the CORESET belongs.

On the other hand, a group-common CORESET #2 for pre-emption indication may be transmitted to a user equipment at every slot, and each CORESET may correspond to a pre-emption region including one slot just before the slot to which the CORESET belongs.

In this case, a bandwidth part (BP) of the group-common CORESET #1 for pre-emption indication and a bandwidth part (BP) of the group-common CORESET #2 for pre-emption indication may be included in the bandwidth of an NR component carrier (CC) and may be different from each other.

Accordingly, pre-emption indication DCI transmitted through a group-common CORESET for pre-emption indication configured in a slot may be defined to indicate time/frequency radio resource information on the occurrence of puncturing or pre-emption in the pre-emption region.

To this end, configuration information for the group-common CORESET for pre-emption indication may be defined to include time/frequency-section configuration information for configuring the pre-emption region corresponding to the group-common CORESET for pre-emption indication, as well as time/frequency resource assignment information on the configuration of the CORESET in a slot (that is, symbol assignment information and PRB assignment information for the configuration of the CORESET).

For example, the time-section configuration information for the configuration of the pre-emption region may be defined to be determined by period configuration information of the group-common CORESET for pre-emption indication.

When a period of the group-common CORESET for pre-emption indication is set to K, the group-common CORESETs for pre-emption indication are configured at every K slots. Accordingly, the pre-emption region corresponding to the group-common CORESET for pre-emption indication, which is configured in a slot #n, may be defined to be configured by means of K slots #(n-K) to #(n−1) or K slots #(n-K+1) to #n on the time axis.

The user equipment, which has received pre-emption indication information transmitted through the group-common CORESET configured in a slot #n, may perform configuration such that the pre-emption region for the pre-emption indication includes of a set of symbols constituting K slots preceding the same (i.e., a set of 14K symbols preceding the first symbol constituting the corresponding group-common CORESET). At this time, the value of K may be indicated to the user equipment through UE-specific, cell-specific, or UE-group-specific higher-layer signalling (e.g., RRC signalling).

In addition, when configuring a group-common CORESET for pre-emption indication for frequency-section configuration for the configuration of a pre-emption region, bandwidth part configuration information of the pre-emption region corresponding to the group-common CORESET for pre-emption indication may be defined as being included. For example, bandwidth part configuration information for frequency-section configuration of a pre-emption region may be defined to be determined by an active bandwidth part of the user equipment in a manner similar to the above-described time-section configuration information.

As described above, the configuration information on the group-common CORESET for pre-emption indication may include time/frequency resource configuration information on the configuration of the CORESET, and pre-emption indication DCI transmitted implicitly or explicitly through the group-common CORESET for pre-emption indication may be defined to include configuration information on the pre-emption region indicating the radio resources, which have been punctured or pre-empted.

In addition, the configuration information on the group-common CORESET for pre-emption indication may include RNTI configuration information for monitoring the pre-emption indication DCI in the CORESET.

Further, one or more group-common CORESETs for pre-emption indication may be configured for a user equipment monitoring the pre-emption indication. In this case, the user equipment may be configured to perform monitoring for pre-emption indication DCI in the CORESET only when PDSCH resource assignment is performed with respect to one or more CORESETs, which have been configured according to the configuration information on the group-common CORESET for pre-emption indication described above, to overlap all or a part of the pre-emption region corresponding to each CORESET.

With regard to a method for a user equipment, which is configured to monitor the pre-emption indication information, to monitor a CORESET in order to receive pre-emption indication DCI according to configuration information on the group-common CORESET for pre-emption indication, even if the CORESET for pre-emption indication is configured in any slot, when PDSCH resources overlapping all or a part of the pre-emption region corresponding to the CORESET are not assigned or PDSCH reception is not performed according thereto, the user equipment may be configured not to perform monitoring for receiving the pre-emption indication DCI for the CORESET of the corresponding slot.

Additionally, in the case where there are one or more TTIs configured for a user equipment set to be in a dynamic puncturing mode in the Embodiment 1 and the Embodiment 2 described above, whether to apply dynamic puncturing may be determined using a function of the TTI to which a PDSCH is assigned.

For example, it is possible to make a configuration such that a threshold value is defined for a PDSCH transmission/reception TTI and the dynamic puncturing is supported, depending on whether a dynamic puncturing mode is configured, only for the user equipment or PDSCH transmission/reception to which a TTI exceeding the threshold value is set. On the other hand, the user equipment or PDSCH transmission/reception, for which a TTI less than the threshold value is set, may be configured such that the dynamic puncturing mode is not configured for the same or such that the dynamic puncturing is not supported for the same regardless of the configuration of the dynamic puncturing mode.

The threshold value may be set by a base station, or the threshold value may be any constant value. In addition, the threshold value may be defined in an absolute time unit (e.g. X ms, where X is a positive number), or may be defined in a unit of a symbol constituting a TTI for each subcarrier spacing (SCS) (e.g., X OFDM symbols for 15 kHz SCS, Y OFDM symbols for 30 kHz SCS, or the like).

Figure 3:
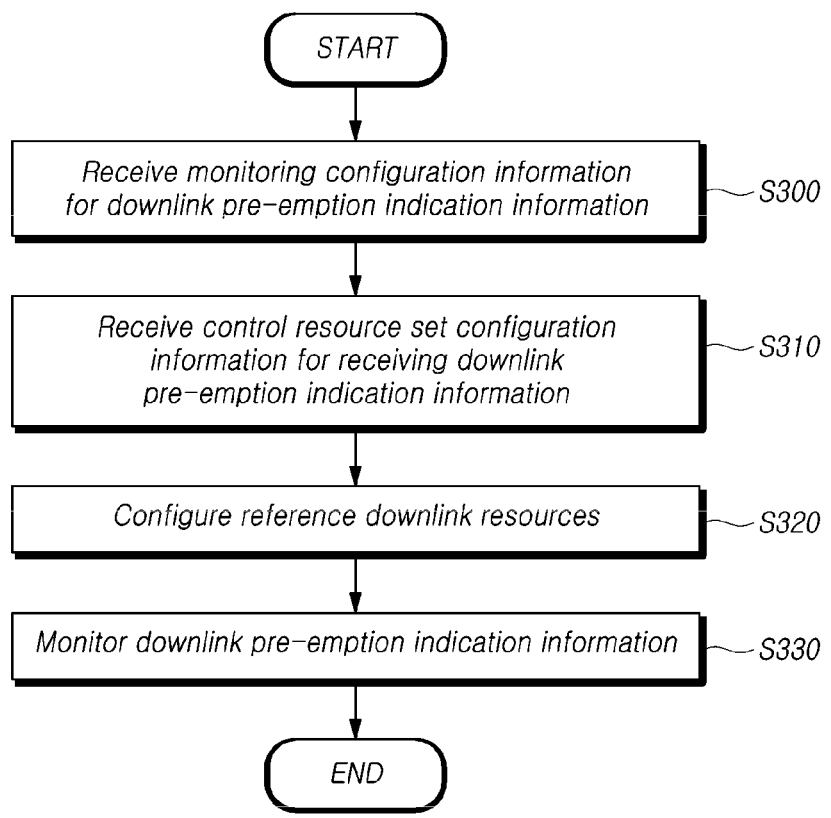
FIG. 3 is a flowchart illustrating a method of a user equipment for receiving downlink pre-emption indication information according to at least one embodiment.

FIG. 3 is a flowchart illustrating a method of a user equipment for receiving downlink pre-emption indication information in accordance with at least one embodiment.

Referring to FIG. 3, the user equipment may receive monitoring configuration information for downlink pre-emption indication information from a base station (S300). The monitoring configuration information may include information on whether to monitor the downlink pre-emption indication, and the monitoring configuration information may be transmitted to the user equipment through UE-specific, cell-specific, or UE-group-specific higher-layer signalling (e.g., RRC signalling) as described in the Embodiment 2 above.

That is, the monitoring configuration information may include information on whether the user equipment must monitor downlink pre-emption indication information, which is used to indicate whether downlink pre-emption has occurred. For example, an eMBB user equipment is required to monitor the downlink pre-emption indication information because the resources that have already been assigned to the eMBB user equipment are likely to be pre-empted by an URLLC user equipment. However, an URLLC user equipment may not be required to monitor the downlink pre-emption indication information because the resources that have already been assigned to the URLLC user equipment are unlikely to be pre-empted by another user equipments.

Next, the user equipment may receive configuration information on a CORESET for receiving downlink pre-emption indication information from the base station (S310).

Subsequently, the user equipment may configure reference downlink resources based on the configuration information on the CORESET, which has been received in Step S310 (S320).

Here, the reference downlink resources denote target resources to be pre-empted and denote resources expressed as pre-emption regions in the above-described Embodiment 2.

At this time, a time section of the reference downlink resources may be determined according to a period for monitoring a CORESET that may include information indicating the pre-emption as described above. For example, as described in the Embodiment 2, when the time section of the reference downlink resources has K slots, the value of K may match a monitoring period for a CORESET that may include information indicating the pre-emption. In addition, a frequency section of the reference downlink resources may be determined by an active bandwidth part of the user equipment.

Then, the user equipment may monitor downlink pre-emption indication information for the reference downlink resources (S330).

At this time, the downlink pre-emption indication information may be indicated through group-common DCI. The group-common DCI may be transmitted to the user equipment through a downlink control channel (PDCCH), which may be transmitted through a group-common CORESET for pre-emption indication described in the Embodiment 2.

In the case where the user equipment monitors a CORESET that may include information indicating pre-emption in order to receive downlink pre-emption indication information, the user equipment may monitor the downlink pre-emption indication information only when the time section, in which the downlink data channel (PDSCH) is assigned to the user equipment, overlaps all or a part of the reference downlink resources as described in the Embodiment 2.

That is, if there is no downlink data channel (PDSCH) assigned to the user equipment among the resources in the reference downlink resources, the user equipment does not need to check the downlink pre-emption because there is no target resource to be pre-empted. Thus, in this case, the user equipment may not perform monitoring for the downlink pre-emption indication information.

Figure 4:
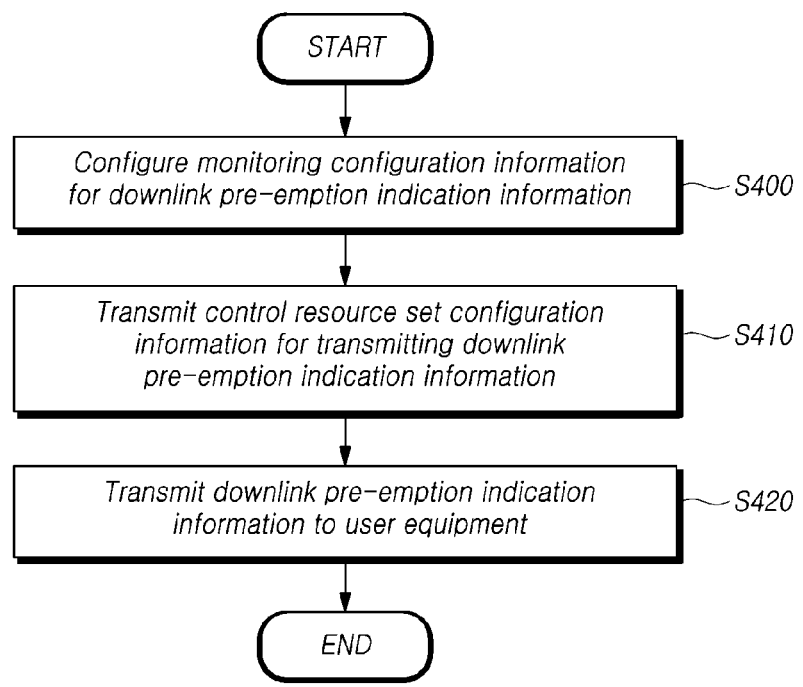
FIG. 4 is a flowchart illustrating a method of a base station for transmitting downlink pre-emption indication information according to at least one embodiment.

FIG. 4 is a flowchart illustrating a method of a base station for transmitting downlink pre-emption indication information in accordance with at least one embodiment.

Referring to FIG. 4, the base station may configure monitoring configuration information for downlink pre-emption indication information (S400). At this time, the monitoring configuration information may include information on whether to monitor the downlink pre-emption indication as described with reference to FIG. 3, and the monitoring configuring information may be transmitted to a user equipment through UE-specific, cell-specific, or UE-group-specific higher-layer signalling as described in the Embodiment 2.

Next, the base station may transmit, to the user equipment, configuration information on a CORESET for transmitting downlink pre-emption indication information (S410). At this time, the downlink pre-emption indication information may be transmitted to the user equipment through group-common DCI. The group-common DCI may be transmitted to the user equipment through a downlink control channel (PDCCH), which may be transmitted through a group-common CORESET for pre-emption indication described in Embodiment 2.

Therefore, the user equipment, which has received the configuration information for the CORESET from the base station, may monitor the CORESET to thus identify the downlink pre-emption indication information.

In addition, the base station may transmit downlink pre-emption indication information for the reference downlink resources to the user equipment (S420).

Here, the reference downlink resource refers to a target resource to be pre-empted and refers to a resource expressed as a pre-emption region in the above-described Embodiment 2.

At this time, a time section of the reference downlink resources may be determined according to a period for monitoring a CORESET that may include information indicating the pre-emption as described above. For example, as described in the Embodiment 2, when the time section of the reference downlink resources has K slots, the value of K may match a monitoring period for a CORESET that may include information indicating pre-emption. In addition, a frequency section of the reference downlink resources may be determined by an active bandwidth part of the user equipment.

Figure 5:
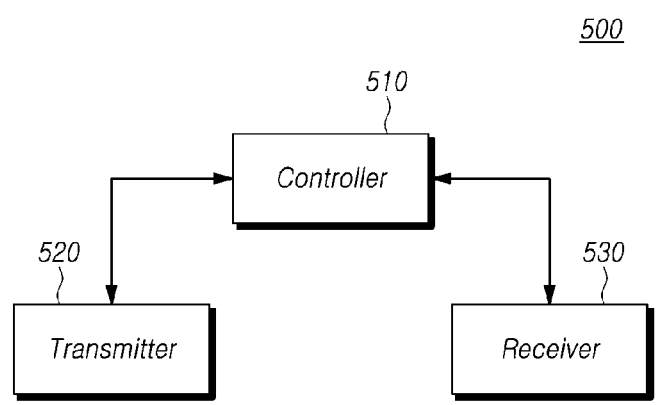
FIG. 5 is a block diagram illustrating a base station according to at least one embodiment.

FIG. 5 is a block diagram illustrating a base station according to at least one embodiment.

Referring to FIG. 5, the base station 500 includes a controller 510, a transmitter 520, and a receiver 530.

The controller 510 may configure monitoring configuration information for downlink pre-emption indication information. At this time, the monitoring configuration information may include information on whether to monitor the downlink pre-emption indication information as described above. In addition, the information may be transmitted to the user equipment through UE-specific, cell-specific, or UE-group-specific higher-layer signalling as described in Embodiment 2.

The transmitter 520 and the receiver 530 are used to transmit and receive signals, messages, and data necessary for performing the present disclosure described above.

More specifically, the transmitter 520 may transmit, to the user equipment, configuration information on a CORESET for transmitting downlink pre-emption indication information, and the transmitter 520 may transmit, to the user equipment, downlink pre-emption indication information for reference downlink resources.

At this time, the downlink pre-emption indication information may be transmitted to the user equipment through group-common DCI. The group-common DCI may be transmitted to the user equipment through a downlink control channel (PDCCH), which may be transmitted through a group-common CORESET for pre-emption indication described in the Embodiment 2.

Therefore, the user equipment, which has received the configuration information for a CORESET from the base station, may monitor the CORESET to thus identify the downlink pre-emption indication information.

Here, the reference downlink resource refers to a target resource to be pre-empted, and the reference downlink resource also refers to a region expressed as a pre-emption region in Embodiment 2 described above.

At this time, a time section of the reference downlink resources may be determined according to a period for monitoring a CORESET that may include information indicating the pre-emption as described above. For example, as described in the Embodiment 2, when a time section of the reference downlink resources has K slots, the value of K may match a monitoring period for a CORESET that may include information indicating pre-emption. In addition, a frequency section of the reference downlink resources may be determined by an active bandwidth part of the user equipment.

Figure 6:
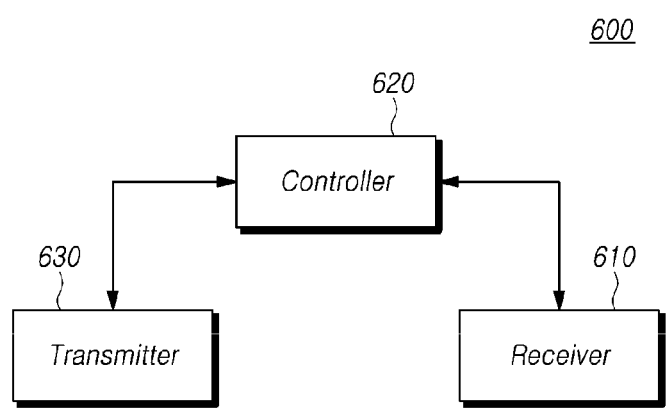
FIG. 6 is a block diagram illustrating a user equipment according to at least one embodiment.

FIG. 6 is a block diagram illustrating a user equipment according to at least one embodiment.

Referring to FIG. 6, the user equipment 600 includes a receiver 610, a controller 620, and a transmitter 630.

The receiver 610 receives, from the base station, downlink control information, data, and messages through a corresponding channel. More specifically, the receiver 610 may receive, from the base station, monitoring configuration information for the downlink pre-emption indication information, and the receiver 610 may receive configuration information on a CORESET for receiving the downlink pre-emption indication information from the base station.

At this time, the monitoring configuration information may include information on whether or not to monitor the downlink pre-emption indication information as described above, and the monitoring configuration information may be transmitted to the user equipment through UE-specific, cell-specific, or UE-group-specific higher-layer signalling as described in Embodiment 2.

The controller 620 may configure reference downlink resources based on the configuration information on the CORESET, and the controller 620 may monitor downlink pre-emption indication information for the reference downlink resources.

Here, the reference downlink resource refers to a target resource to be pre-empted, and the reference downlink resource also refers to a resource expressed as a pre-emption region in the Embodiment 2 described above. As described above, a time section of the reference downlink resources may be determined according to a period for monitoring a CORESET that may include information indicating the pre-emption. For example, as described in the Embodiment 2, when the time section of the reference downlink resources has K slots, the value of K may match a monitoring period for a CORESET that may include information indicating pre-emption. In addition, a frequency section of the reference downlink resources may be determined by an active bandwidth part of the user equipment.

In addition, the downlink pre-emption indication information may be indicated through group-common DCI. The group-common DCI may be transmitted to the user equipment through a downlink control channel (PDCCH), which may be transmitted through the group-common CORESET for pre-emption indication described in the Embodiment 2.

In the case where the user equipment monitors a CORESET that may include information indicating pre-emption for receiving downlink pre-emption indication information, the user equipment may monitor the downlink pre-emption indication information only when the time section, in which the downlink data channel (PDSCH) is assigned to the user equipment, overlaps all or a part of the reference downlink resources as described in Embodiment 2.

That is, if there is no downlink data channel (PDSCH) assigned to the user equipment among the resources in the reference downlink resources, the user equipment does not need to check the downlink pre-emption because there is no target resource to be pre-empted. Thus, in this case, the user equipment may not perform monitoring for the downlink pre-emption indication information.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for receiving downlink pre-emption information by a wireless device, the method comprising:

receiving, by the wireless device, radio network temporary identifier (RNTI) information for monitoring downlink pre-emption information through a higher layer signaling;

receiving, by the wireless device, information related to a control resource set (CORESET), and monitoring, by the wireless device, the downlink pre-emption information based on the RNTI information and the information related to the CORESET;

wherein the downlink pre-emption information indicates at least one of a time resource or a frequency resource in which pre-emption has occurred, wherein the time resource is configured within a time duration, which is determined based on the information related to the CORESET, wherein the downlink pre-emption information comprises a plurality of downlink pre-emption indicators, wherein each of the plurality of downlink pre-emption indicators corresponds to a respective pre-empted region, wherein the information related to a CORESET includes a monitoring period K for the CORESET where K is an integer number equal to or greater than 1, and wherein a time duration of at least one of the time resources comprises specific symbols related to the monitoring period K just before a first symbol constituting the CORESET.

2. The method of claim 1, wherein the information related to the CORESET comprises associated period information.

3. The method of claim 1, wherein the time resource comprises one or more symbols, and the frequency resource comprises one or more physical resource blocks.

4. The method of claim 1, wherein the downlink pre-emption information is received through a group common downlink control information.

5. The method of claim 4, wherein the frequency resource comprises at least one different frequency section in which pre-emption has occurred.

6. The method of claim 1, wherein the time resource comprises at least one different time section in which pre-emption has occurred.

7. A device, comprising:
a transmitter;
a receiver; and
a controller which controls the transmitter and the receiver thereby performing operations including:
receiving, by the wireless device, radio network temporary identifier (RNTI) information for monitoring downlink pre-emption information through a higher layer signaling;
receiving, by the wireless device, information related to a control resource set (CORESET), and
monitoring, by the wireless device, the downlink pre-emption information based on the RNTI information and the information related to the CORESET;
wherein the downlink pre-emption information indicates at least one of a time resource or a frequency resource in which pre-emption has occurred,
wherein the time resource is configured within a time duration, which is determined based on the information related to the CORESET,
wherein the downlink pre-emption information comprises a plurality of downlink pre-emption indicators,
wherein each of the plurality of downlink pre-emption indicators corresponds to a respective pre-empted region,
wherein the information related to a CORSET includes a monitoring period K for the CORESET where K is an integer number equal to or greater than 1, and
wherein a time duration of at least one of the time resources comprises specific symbols related to the monitoring period K just before a first symbol constituting the CORESET.

8. The device of claim 7, wherein the information related to the CORESET comprises associated period information.

9. The device of claim 7, wherein the time resource comprises one or more symbols, and the frequency resource comprises one or more physical resource blocks.

10. The device of claim 7, wherein the downlink pre-emption information is received through a group common downlink control information.

11. The device of claim 7, wherein the time resource comprises at least one different time section in which pre-emption has occurred.

12. The device of claim 11, wherein the frequency resource comprises at least one different frequency section in which pre-emption has occurred.

13. A base station, comprising:
a transmitter;
a receiver; and
a controller which controls the transmitter and the receiver thereby performing operations including:
transmitting radio network temporary identifier (RNTI) information for monitoring downlink pre-emption information through a higher layer signaling; and
transmitting information related to a control resource set (CORESET);
wherein the downlink pre-emption information indicates at least one of a time resource and a frequency resource in which pre-emption has occurred,
wherein the time resource is configured within a time duration, which is determined based on the information related to the CORESET,
wherein the downlink pre-emption information comprises a plurality of downlink pre-emption indicators,
wherein each of the plurality of downlink pre-emption indicators corresponds to a respective pre-empted region,
wherein the information related to a CORSET includes a monitoring period K for the CORESET where K is an integer number equal to or greater than 1, and
wherein a time duration of at least one of the time resources comprises specific symbols related to the monitoring period K just before a first symbol constituting the CORESET.

14. The base station of claim 13, wherein the information related to the CORESET comprises associated period information.

15. The base station of claim 13, wherein the time resource comprises one or more symbols, and the frequency resource comprises one or more physical resource blocks.

16. The base station of claim 13, wherein the downlink pre-emption information is received through a group common downlink control information.

17. The base station of claim 13, wherein the time resource comprises at least one different time section in which pre-emption has occurred.

18. The base station of claim 17, wherein the frequency resource comprises at least one different frequency section in which pre-emption has occurred.

19. A communication method, comprising:
receiving, by a communication device, a first message comprising a radio network temporary identifier (RNTI) and information related to a control resource set (CORESET) through a higher layer signaling;
obtaining, by the communication device, downlink pre-emption information in a first CORESET based on the RNTI and the information related to a CORESET; and
determining, by the communication device, one or more pre-empted resources based on the downlink pre-emption information,
wherein:
the downlink pre-emption information indicates the one or more pre-empted resources in a time duration prior to a first symbol of the first CORESET; and
the first message further comprises information related to a monitoring period and the time duration is determined based on the information related to the monitoring period.

20. The method of claim 19, wherein the information related to the CORESET comprises associated period information.

21. The method of claim 19, wherein the time duration comprises one or more symbols.

22. The method of claim 19, wherein the downlink pre-emption information is received through a group common downlink control information (DCI).

23. The method of claim 19, wherein the one or more pre-empted resources comprises at least one different time duration in which pre-emption has occurred.

24. A communication device, comprising:
a memory; and
a processor operably coupled with the memory,
wherein the processor is configured to:
cause the device to receive a first message comprising a radio network temporary identifier (RNTI) and information related to a control resource set (CORESET) through a higher layer signaling;
obtain downlink pre-emption information in a first CORESET based on the RNTI and the information related to CORESET; and
determine one or more pre-empted resources based on the downlink pre-emption information,
wherein:
the downlink pre-emption information indicates the one or more pre-empted resources in a time duration prior to a first symbol of the first CORESET, and
the first message further comprises information related to a monitoring period and the time duration is determined based on the information related to the monitoring period.

25. The communication device of claim 24, wherein the information related to the CORESET comprises associated period information.

26. The communication device of claim 24, wherein the time duration comprises one or more symbols.

27. The communication device of claim 24, wherein the downlink pre-emption information is received through a group common downlink control information (DCI).

28. The communication device of claim 24, wherein the one or more pre-empted resources comprises at least one different time duration in which pre-emption has occurred.

* * * * *